US011720579B2

(12) United States Patent
O'Hara et al.

(10) Patent No.: US 11,720,579 B2
(45) Date of Patent: Aug. 8, 2023

(54) CONTINUOUS FEATURE-INDEPENDENT DETERMINATION OF FEATURES FOR DEVIATION ANALYSIS

(71) Applicant: BUSINESS OBJECTS SOFTWARE LTD., Dublin (IE)

(72) Inventors: Paul O'Hara, Dublin (IE); Malte Christian Kaufmann, Dublin (IE); Alan McShane, Raheny (IE); Anirban Banerjee, Kilcullen (IE); Mark Ahern, Dublin (IE)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 93 days.

(21) Appl. No.: 17/367,882

(22) Filed: Jul. 6, 2021

(65) Prior Publication Data

US 2023/0010992 A1    Jan. 12, 2023

(51) Int. Cl.
*G06F 16/2458* (2019.01)
*G06F 16/28* (2019.01)
*G06F 16/2457* (2019.01)

(52) U.S. Cl.
CPC ...... *G06F 16/2462* (2019.01); *G06F 16/2457* (2019.01); *G06F 16/283* (2019.01)

(58) Field of Classification Search
CPC . G06F 16/2462; G06F 16/2457; G06F 16/283
USPC .......................................................... 707/722
See application file for complete search history.

(56) References Cited

U.S. PATENT DOCUMENTS

2017/0102978 A1* 4/2017 Pallath ................ G06F 11/0751

OTHER PUBLICATIONS

Communication: "Extended European Search Report", dated May 6, 2022 (dated Jun. 5, 2022), European Patent Office, for European Application No. 21209818.5-1203, 8 pages.
Jian, Sheng-yi et al., "Efficient feature selection based on correlation measure between continuous and discrete features", Information Processing Letters, vol. 116, No. 2, Jul. 17, 2015 (Jul. 17, 2015), ISSN: 0020-0190, DOI: 10.1016/J.IPL.2015.07.005, 13pgs.

* cited by examiner

*Primary Examiner* — Michael Pham
(74) *Attorney, Agent, or Firm* — Buckley, Maschoff & Talwalkar LLC

(57) ABSTRACT

Systems and methods include determination, for each of a plurality of discrete features, of statistics based on a number of occurrences of each discrete value of the discrete feature in the data, determination of first summary statistics based on the determined statistics, determine of a dissimilarity for each discrete feature based on the first summary statistics and on the statistics determined for the discrete feature, determination of candidate discrete features based on the determined dissimilarities, determination, for each of the candidate discrete features, of second summary statistics based on values of a continuous feature associated with each discrete value of the candidate discrete feature, determination of a deviation score for each of the candidate discrete features based on the second summary statistics, and transmission of the candidate discrete features for display in association with the continuous feature based on the determined deviation scores.

18 Claims, 6 Drawing Sheets

| DiscrFeatA | DiscrFeatB | DiscrFeatC | DiscrFeatD |
|---|---|---|---|
| A1 | B3 | C2 | D3 |
| A2 | B1 | C1 | D2 |
| A2 | B4 | C3 | D5 |
| A1 | B1 | C3 | D6 |
| A1 | B2 | C1 | D1 |
| A3 | B4 | C2 | D7 |
| A2 | B4 | C4 | D4 |
| A3 | B3 | C1 | D3 |
| A2 | B3 | C2 | D5 |

*FIG. 3*

| Discete Feature | min | max | mean | variance |
|---|---|---|---|---|
| DiscrFeatA | 2 | 4 | 3 | 1 |
| DiscrFeatB | 1 | 3 | 2.25 | .917 |
| DiscrFeatC | 1 | 3 | 2.25 | .917 |
| DiscrFeatD | 1 | 2 | 1.286 | .238 |
| Average | 1.25 | 3 | 2.197 | .768 |

*FIG. 4*

| ContFeat1 |
|---|
| 4 |
| 8 |
| 7 |
| 6 |
| 4 |
| 2 |
| 3 |
| 4 |
| 6 |

| DiscrFeatB | sum |
|---|---|
| B1 | 14 |
| B2 | 4 |
| B3 | 14 |
| B4 | 12 |
| mean | 11 |
| α | 14 |

*FIG. 5*

CONTINUOUS FEATURE-INDEPENDENT DETERMINATION OF FEATURES FOR DEVIATION ANALYSIS

BACKGROUND

Today's organizations collect and store large amounts of data at an ever-increasing rate. Examples of these large data flows include sensor data and financial data. The Internet of Things has greatly increased the number of deployed sensors, which has exponentially increased the amount of sensor data generated thereby. The finance industry generates huge quantities of data to facilitate predictions, pattern recognition and strategic planning.

Performing calculations upon or identifying patterns within these large sets of data can be time-consuming or even infeasible. Modern data analytics attempts to assist humans in efficiently understanding such data. For example, data mining uses machine learning and/or statistical techniques to discover potentially useful patterns within large amounts of data stored in databases, data warehouses, or other information repositories.

Deviation analysis is a type of data mining which may include determining the deviation between a selected continuous feature (e.g., Sales) and a discrete feature (e.g., Color, Type) of a set of data. For example, deviation analysis may determine whether all discrete values (Blue, Red, Green) of a discrete feature (Color) behave in a roughly similar manner with respect to a continuous feature (Sales). If not, deviation analysis may further indicate a degree to which any one discrete value deviates from the norm (e.g., Blue contributes to Sales much more strongly than Red or Green). Deviation analysis may be performed for each of several discrete features with respect to a same continuous feature in order to determine which discrete feature includes the most-deviating discrete values.

Mining deviation relationships between a selected continuous feature and the discrete features of a large set of data can be computationally expensive, particularly in a case that the set of data contains many discrete features, each of which contains many discrete values. Improved systems for performing deviation analysis are desired, which require fewer computational resource requirements than conventional systems while producing a suitable quality of deviation analysis.

BRIEF DESCRIPTION OF THE DRAWINGS

FIG. 3 comprises tabular representations of selected discrete feature data according to some embodiments.

FIG. 4 illustrates statistics determined for selected discrete features according to some embodiments.

FIG. 5 illustrates statistics determined for selected discrete features for input to deviation analysis according to some embodiments.

DETAILED DESCRIPTION

The following description is provided to enable any person in the art to make and use the described embodiments and sets forth the best mode contemplated for carrying out some embodiments. Various modifications, however, will be readily-apparent to those in the art.

As used herein, a feature refers to an attribute of a set of data. In the case of tabular data, each column may be considered as representing a respective feature of the data, while each row is an instance of values of each feature of the data. A continuous feature is represented using numeric data having an infinite number of possible values within a selected range. A discrete feature is represented by data having a finite number of possible values, hereinafter referred to as discrete values. Temperature is an example of a continuous feature, while days of the week and gender are examples of discrete features.

Some embodiments provide automated and efficient selection of discrete features of a set of data to which deviation analysis may then be applied. The selected discrete features are referred to herein as "candidate" features. Embodiments may therefore avoid performing deviation analysis on non-selected discrete features, and the associated resource consumption, while providing a result similar to that which would be produced if deviation analysis were applied to all discrete features of the set of data.

According to some embodiments, selection of candidate discrete features is independent of any continuous features within the set of data. The candidate discrete features for a given set (or subset) of data may therefore be determined before a user selects any continuous features for deviation analysis. Once the user selects one or more continuous features for deviation analysis, the deviation analysis may proceed with respect to only the candidate discrete features, as opposed to the more time-consuming task of performing deviation analysis for each selected continuous feature in view of all discrete features of the set of data.

The determination of candidate features as described herein attempts to identify those discrete features within a set of data for which deviation analysis is more likely to produce anomalous deviation scores with respect to any continuous feature of the set of data, and which therefore exhibit a stronger deviational relationship with a given continuous feature than other discrete features within the set of data. This identification may allow the other discrete features to be ignored during deviation analysis, thereby improving the efficiency thereof without adversely affecting the results. Although embodiments described below subject the identified candidate features to subsequent deviation analysis, embodiments are not limited thereto.

Figure 1A:
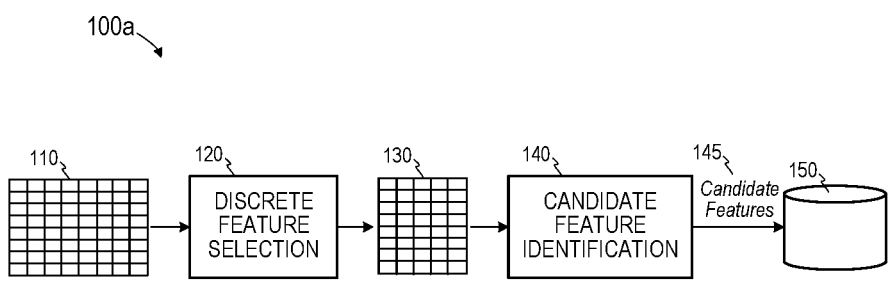
FIG. 1A is a block diagram of an architecture to identify candidate discrete features for deviation analysis according to some embodiments.
Figure 1B:
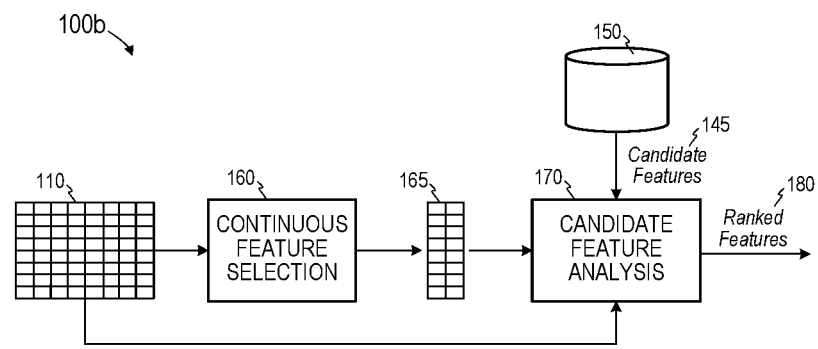
FIG. 1B is a block diagram of an architecture to perform deviation analysis on a plurality of discrete features with respect to one or more selected continuous features according to some embodiments.

FIG. 1A is a block diagram of architecture 100a to identify candidate discrete features for deviation analysis according to some embodiments. The illustrated components may be implemented using any suitable combination of computing hardware and/or software that is or becomes known. In some embodiments, two or more components are implemented by a single computing device. Two or more components of FIG. 1A may be co-located. One or more components may be implemented as a cloud service (e.g., Software-as-a-Service, Platform-as-a-Service). A cloud-based implementation of any components of FIG. 1A (or FIG. 1B) may apportion computing resources elastically according to demand, need, price, and/or any other metric.

Data 110 may comprise values of a database table. More specifically, data 110 may comprise rows of database table, with each row including a value of a corresponding database column, or feature. Data 110 consists of at least one continuous feature and one or more discrete features.

Discrete feature selection component 120 identifies one or more discrete features of data 110. The one or more discrete features may be selected by a user (not shown). In some embodiments, a user does not select any discrete features, in which case discrete feature selection component 120 selects all discrete features of data 110. In the FIG. 1A example, columns 130 include values from data 110 of the discrete features selected by discrete feature selection component 120.

In some embodiments, discrete feature selection component 120 selects one or more continuous features of data 110 contemporaneously with the selection of columns 130. As described below, such selected continuous features are not involved in the processing of architecture 100a but may be utilized in the processing of architecture 100b of FIG. 1B.

Candidate feature identification component 140 determines a dissimilarity score for each selected discrete feature. The dissimilarity score for a discrete feature is determined based on statistics determined for the discrete feature. As will be described below, statistics for a discrete feature may be determined based on a number of occurrences of each discrete value of the discrete feature.

The dissimilarity score determined for a discrete feature represents a likelihood that a significant deviation score will be determined for the discrete feature by candidate feature analysis component 170. According to some embodiments, candidate feature identification component 140 outputs the discrete features associated with the N highest dissimilarity scores as candidate features 145.

Candidate features 145 may be stored in storage device 150, which may comprise volatile (e.g., Random Access) memory and/or persistent (e.g., disk-based) memory. Accordingly, in some embodiments, user selection or use of data 110 may trigger the FIG. 1A operation to generate and store candidate features 145. Consequently, in a case that the user later requests a top contributor analysis in view of one or more continuous features of data 110, the processing illustrated in FIG. 1B may be efficiently executed based on already-known stored candidate features 145.

Architecture 100b includes continuous feature selection component 160 for selecting one or more continuous features of data 110. In the present example, columns 165 includes values from data 110 of the continuous features selected by continuous feature selection component 160. Columns 165 are provided to candidate feature analysis component 170, along with candidate features 145 from storage device 150. As described above, discrete feature selection component 120 of architecture 100a may operate to select one or more continuous features in some embodiments, in which case the selected one or more continuous features and the determined candidate discrete features may be provided to candidate feature analysis component 170 directly after determination of the candidate discrete features.

Candidate feature analysis component 170 applies a deviation analysis algorithm to received columns 165 and to the columns of data 110 which are associated with received candidate discrete features 145 to produce a deviation score for each candidate discrete feature 145. For each selected continuous feature, candidate feature analysis component 170 determines the deviation score for each candidate discrete feature 145 based on statistics which are in turn determined based on values of the continuous feature which correspond to each discrete value of the candidate discrete feature 145.

Each deviation score indicates a deviational relationship of a candidate discrete feature 145 to a selected continuous feature. Candidate discrete features 145 are then ordered (i.e., ranked) and output as ranked features 180 based on their respective deviation scores. Each selected continuous feature may be associated with different deviation scores for a given discrete feature, so the ordering of candidate discrete features 145 may differ for each selected continuous feature.

Embodiments may produce an ordered list of discrete features, and respective deviation scores, more quickly and/or using less resources than systems in which deviation scores are determined for all selected discrete features. In particular, the initial determination of candidate discrete features from a set of selected discrete features allows avoidance of deviation score determination for those discrete features which are likely not associated with significant deviation with respect to the subject continuous feature. Moreover, by decoupling the determination of candidate discrete features from the deviation analysis with respect to one or more continuous features, the candidate discrete features may be determined in advance of a user instruction to analyze a particular one or more continuous features.

Figure 2:
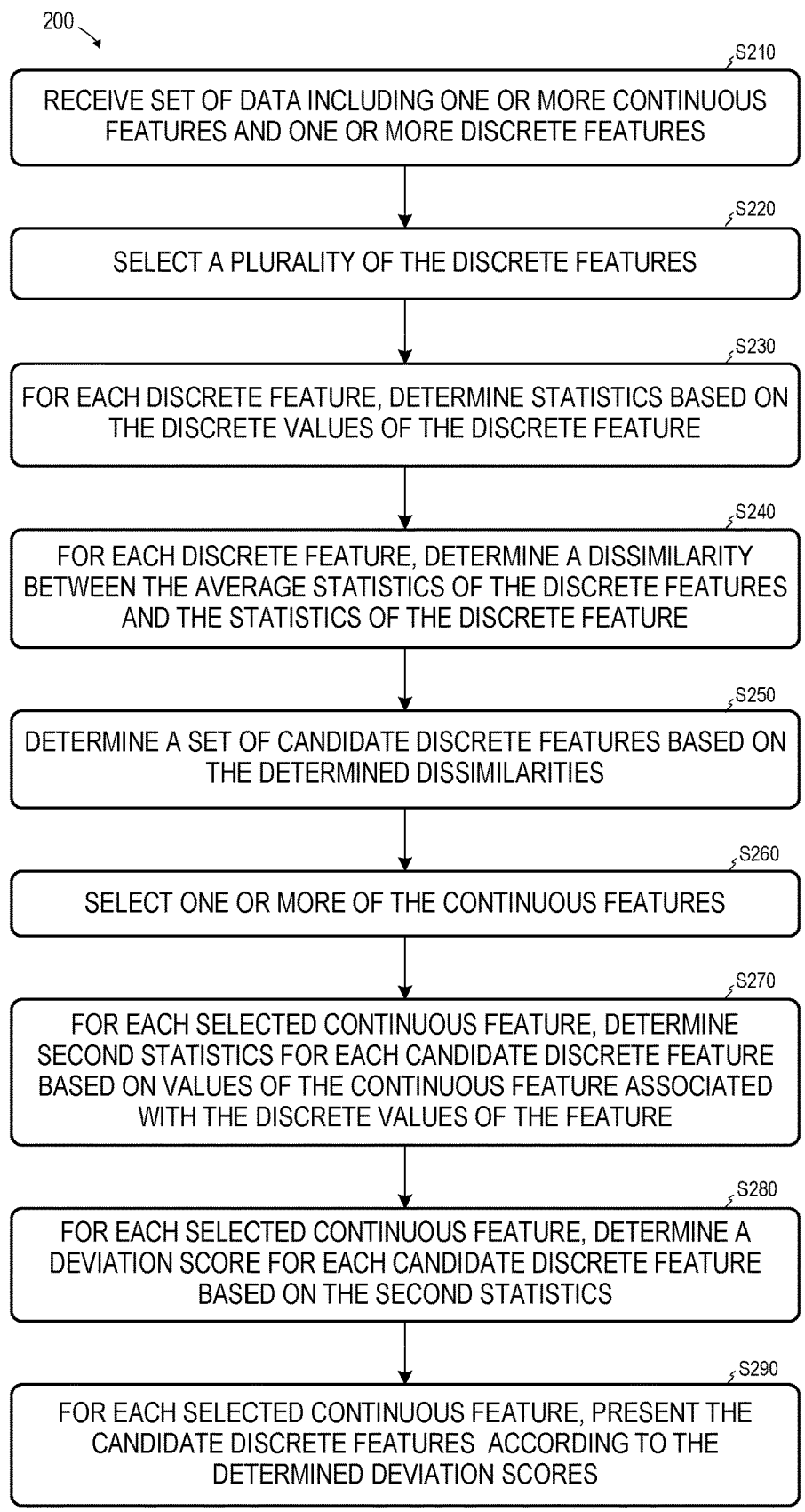
FIG. 2 comprises a flow diagram of a process to perform deviation analysis on a plurality of discrete features with respect to one or more selected continuous features according to some embodiments.

FIG. 2 is a flow diagram of process 200 to perform deviation analysis on a plurality of discrete features with respect to one or more continuous features according to some embodiments. Process 200 and the other processes described herein may be performed using any suitable combination of hardware and software. Program code embodying these processes may be stored by any non-transitory tangible medium, including a fixed disk, a volatile or non-volatile random access memory, a DVD, a Flash drive, or a magnetic tape, and executed by any one or more processing units, including but not limited to a processor, a processor core, and a processor thread. Embodiments are not limited to the examples described below.

Process 200 may be initiated by user selection of a particular set of data, e.g., a table of transactional data (Sales), or a subset thereof (Sales, EMEA, 2020). A user may, for example, select such data for analysis via a data analytics application.

The set of data is received at S210, in a structured form such as a tabular format. The structured format facilitates definition of one or more continuous features and one or more discrete features within the data. For example, each column of a table includes all the values of a single particular feature of the table, and each of such values is associated with exactly one specific row of the table.

A plurality of the discrete features is selected at S220. In some embodiments, if no discrete features are selected by a user at S220, then all discrete features of the set of data are assumed to be selected at S220. According to some embodiments, one or more continuous features are also selected at S220. The selected continuous features are those continuous features with respect to which the deviation of each selected discrete feature is to be determined and ranked.

Statistics are determined at S230 for each discrete feature. The statistics for a given discrete feature are determined based on the number of occurrences of each discrete value of the discrete feature within the set of data. Examples of statistics determined at S230 include but are not limited to min, max, mean, variance and size (i.e., the number of distinct discrete values of the discrete feature).

FIG. 3 illustrates columns 310 of four discrete features selected at S220 according to some embodiments. Columns 310 may comprise columns of a set of data which was received at S210 and which includes one or more other columns of discrete or continuous features. Each of columns 310 includes discrete values of its respective discrete feature.

As mentioned above, statistics are determined at S230 for each discrete feature based on the number of occurrences of its discrete values within the data set. Table 410 illustrates determined statistics for discrete features DiscrFeatA, DiscrFeatB, DiscrFeatC, and DiscrFeatD, based on the number of occurrences of each of their respective discrete values.

Row 412 of table 410 shows statistics determined at S230 for DiscrFeatA. As shown in FIG. 3, discrete value A3 of discrete feature DiscrFeatA appears 2 times, while discrete values A1 and A2 appear 3 and 4 times, respectively. Accordingly, row 412 shows a min number of occurrences of 2, a max number of occurrences of 4, a mean number of occurrences (i.e., across all discrete values) of 3, and a variance of 1. Discrete values B1, B2, B3 and B4 of discrete feature DiscrFeatB occur 2, 1, 3 and 3 times, respectively. Accordingly, row 414 indicates a min number of occurrences of 1, a max number of occurrences of 3, a mean number of occurrences of 2.25, and a variance of 0.917. The statistics of discrete features DiscrFeatC and DiscrFeatD are determined similarly and shown in rows 416 and 418.

A dissimilarity score is determined for each discrete feature at S240 based on the statistics determined for each discrete value at S230. According to some embodiments, the dissimilarity score for a discrete feature is determined based on the averages of the statistics determined for the discrete features, and the dissimilarity of the statistics determined for each discrete feature to the averages. While an average of the discrete feature-specific statistics is used to determine dissimilarities in the present example, embodiments may employ another statistical summary of the discrete feature-specific statistics from which the dissimilarities are determined.

Row 420 of FIG. 4 illustrates the averages of each statistic determined for the discrete features at S230. S240 may comprise the determination of a score representing the distances from the statistics of each row of table 410 to the average statistics of row 420. The score may represent a maximum distance, an average distance, or any other value determined based on the determined distances. The distances may be computed as cosine dissimilarities, but embodiments are not limited thereto.

The cosine similarity algorithm measures the similarity between two vectors (e.g., lists of values). This similarity is defined as the cosine angle between the two vectors and indicates a degree to which the two vectors are pointing in the same direction.

Generally, $$\text{cosine similarity}(X, Y) = \frac{X \cdot Y}{\|X\| * \|Y\|},$$

where $$X \cdot Y = \sqrt{\sum_{i=1}^{n} X_i * Y_i}, \|X\| = \sqrt{\sum_{i=1}^{n} X_i^2}, \text{ and } \|Y\| = \sqrt{\sum_{i=1}^{n} Y_i^2}.$$

S240 may therefore comprise determining cosine similarities between the average statistics of all the discrete features (e.g., the values of row 420) and the statistics associated with each discrete feature (e.g., the values of each of rows 412, 414, 416, 418). As a result, a cosine similarity is determined for each discrete feature. The determined cosine similarities may be considered also as dissimilarity scores, in that a lower cosine similarity corresponds to a greater dissimilarity.

A set of candidate discrete features is determined at S250 based on the determined dissimilarities scores. In this regard, a dissimilarity score is determined at S240 for each discrete feature selected at S220. In some embodiments, the selected discrete features associated with the N largest dissimilarity scores (i.e., the N smallest cosine similarities) are determined as the candidate discrete features at S250. N may be any desired number, and may be selected to limit an amount of processing resources required to perform the below-described deviation analysis on the candidate discrete features.

As described above, S210 through S250 may be determined as soon as a set of data is identified, without user selection of any continuous features. S210 through S250 therefore may provide a set of candidate discrete features for performing deviation analysis with respect to any continuous feature of the set of data. Assuming that no continuous features have been selected, one or more continuous features are selected at S260.

For each selected continuous feature, second statistics are determined at S270 for each candidate discrete feature in preparation for deviation analysis at S280. The second statistics determined for a discrete feature are based on values of the selected continuous feature which are associated with each discrete value of the discrete feature. In some embodiments of S270, the continuous values associated with each discrete value of a discrete feature are summed, and the second statistics for the discrete feature are determined based on the sums.

FIG. 5 illustrates the determination of second statistics for a discrete feature in view of a continuous feature at S270 according to some embodiments. Column 510 includes values of a selected continuous feature ContFeat1 of the set of data which includes columns 310 of FIG. 3. Table 520 shows a sum of the values of continuous feature ContFeat1 associated with each of discrete values B1, B2, B3, B4 of discrete feature DiscrFeatB. According to this example, the second statistics of discrete feature DiscrFeatB include the mean (11) of the sums and a value of $\alpha$ (e.g., the min of the sums if the mean is negative, or the max of the sums if the mean is positive).

Second statistics are determined in this manner for each discrete feature with respect to each selected continuous feature. For example, if only continuous feature ContFeat1 is selected at S260, S270 comprises determination of four (mean, $\alpha$) pairs, with each pair corresponding to one of discrete features DiscrFeatA, DiscrFeatB, DiscrFeatC, and DiscrFeatD. If continuous feature ContFeat1 and another continuous feature (e.g., ContFeat3) are selected at S260, S270 comprises determination of eight (mean, $\alpha$) pairs, with each pair corresponding to one of discrete features DiscrFeatA, DiscrFeatB, DiscrFeatC, and DiscrFeatD and one of continuous features ContFeat1 and ContFeat3. Any type of second statistics for a discrete feature may be determined at S270 based on values of a selected continuous feature which are associated with each discrete value of the discrete feature. Generally, the determined second statistics are those which are required as inputs to the particular deviation analysis algorithm to be employed at S280.

For each selected continuous feature, a deviation score is determined for each candidate discrete feature at S280. The deviation scores are determined based on the second statistics determined at S270. According to one non-exhaustive embodiment, determination of a deviation score for a discrete feature is as follows:

$$\text{deviation score}_{disc\ feature, con\ feature} = \frac{\alpha - \text{mean}_{sum\ discrete\ values, con\ feature}}{\text{mean}_{sum\ discrete\ values, con\ feature}}$$

where, as described above:

$$\alpha = \begin{cases} \max(\{f(x): x = \text{sum discrete value}_i, \ldots \text{sum discrete value}_n\}), & \text{mean}_{sum\ discrete\ values} \geq 0 \\ \min(\{f(x): x = \text{sum discrete value}_i, \ldots \text{sum discrete value}_n\}), & \text{mean}_{sum\ discrete\ values} < 0 \end{cases}$$

According to the above example, the deviation score determined for discrete feature DiscrFeatB in view of continuous feature ContFeat1 is (14−11)/11==0.273.

At S290, the candidate discrete features are presented according to their respective deviation scores, for each selected continuous feature. For example, for continuous feature ContFeat1, the candidate discrete features may be ordered from highest deviation score determined with respect to continuous feature ContFeat1 to lowest deviation score determined with respect to continuous feature ContFeat1, where a larger deviation score indicates larger deviational behavior between discrete values of the discrete feature with respect to continuous feature ContFeat1.

Figure 6:
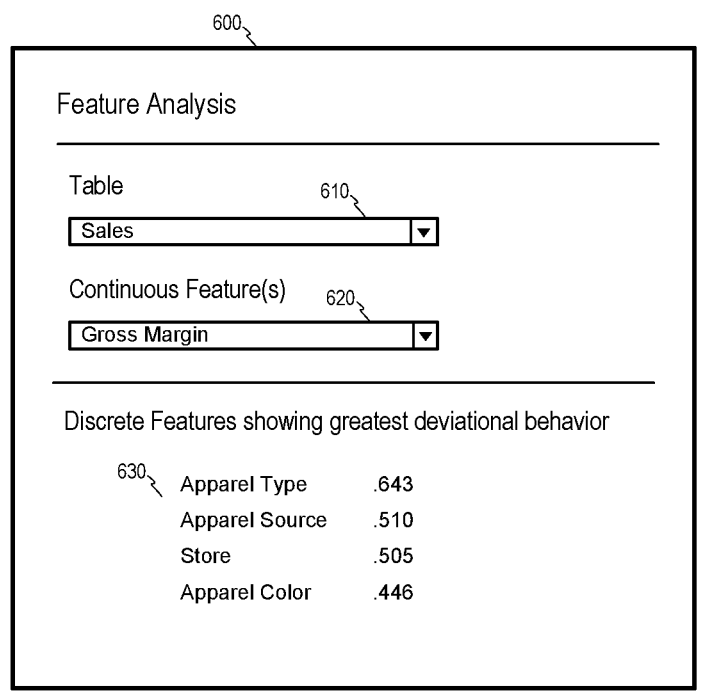
FIG. 6 is an outward view of a user interface presenting proportional contributions of each of a plurality of discrete values to an output value according to some embodiments.

FIG. 6 illustrates user interface 600 of a data analysis application according to some embodiments. A user may execute a Web browser to access the data analysis application via HyperText Transfer Protocol and receive user interface 600 in return.

User interface 600 includes drop-down field 610 for selecting a table to which the user has access. Selection of a table may result in execution of process 200 in order to determine candidate discrete features of the table. In the present example, all discrete features of the table are selected at S220.

In the meantime, drop-down menu 620 is populated with a list of selectable continuous features of the selected table. After user selection of one or more continuous features, S260 through S290 may be executed to determine deviation scores for each candidate discrete feature, for each selected continuous feature. Area 630 of user interface 600 shows such candidate discrete features presented in order according to deviation score with respect to the selected Gross Margin continuous feature. Embodiments are not limited to user interface 600. Embodiments may utilize any interface metaphor for selecting one or more continuous features of a table (and optionally one or more discrete features of the table) and for presenting candidate discrete features based on corresponding determined deviation scores.

Figure 7:
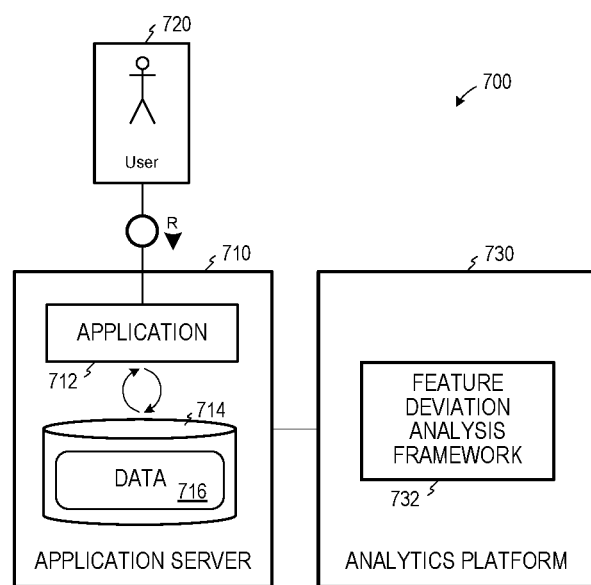
FIG. 7 illustrates a system to provide data analytics according to some embodiments.

FIG. 7 illustrates system 700 to provide data analytics including data mining to applications according to some embodiments. Application server 710 may comprise an on-premise or cloud-implemented server providing an execution platform and services to applications such as application 712. Application 712 may comprise program code executable by a processing unit to provide functions to users such as user 720 based on coded logic and on data 716 stored in data store 714. Data 716 may comprise tabular data stored in a columnar or row-based format, object data or any other type of data that is or becomes known. Data store 714 may comprise any suitable storage system such as database system, which may be partially or fully remote from application server 710, and may be distributed as is known in the art.

According to some embodiments, user 720 may interact with application 712 (e.g., via a Web browser executing a front-end UI application associated with application 712) to request deviation analysis of discrete features in view of one or more continuous features of a table of data 716. Application 712 may access analytics platform 730 to serve this request. Analytics platform 730 may also be implemented by on-premise or cloud-based servers.

Analytics platform 730 includes program code of feature deviation analysis framework 732, which may be executed to determine candidate discrete features and a deviation score for each candidate discrete feature with respect to one or more continuous features as described herein. Analytics platform 730 may provide the candidate discrete features and deviation scores to application 712 for subsequent presentation to user 720. Analytics platform 730 may provide additional functionality to applications, such as but not limited to machine learning model training and inference.

Figure 8:
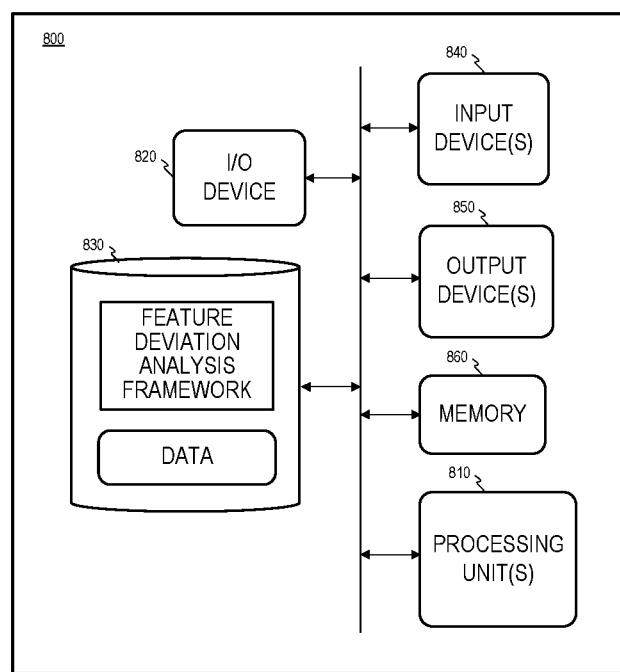
FIG. 8 is a block diagram of a hardware system for determining proportional contributions of each of a plurality of discrete values to an output value according to some embodiments.

FIG. 8 is a block diagram of a hardware system to determine candidate discrete features and corresponding deviation scores with respect to one or more continuous features according to some embodiments. Hardware system 800 may comprise a general-purpose computing apparatus and may execute program code to perform any of the functions described herein. Hardware system 800 may be implemented by a distributed cloud-based server and may comprise an implementation of analytics platform 730 in some embodiments. Hardware system 800 may include other unshown elements according to some embodiments.

Hardware system 800 includes processing unit(s) 810 operatively coupled to I/O device 820, data storage device 830, one or more input devices 840, one or more output devices 850 and memory 860. I/O device 820 may facilitate data exchange with external devices, such as an external network, the cloud, or data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into hardware system 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, and RAM devices, while memory 860 may comprise a RAM device.

Data storage device 830 stores program code of a feature deviation analysis framework which is executable by processing unit(s) 810 to cause hardware system 800 to implement any of the components and execute any one or more of the processes described herein. Embodiments are not limited to execution of these processes by a single computing device. Data storage device 830 may also store data and other program code for providing additional functionality and/or which are necessary for operation of hardware system 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processing unit to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
   a memory storing processor-executable program code; and
   a processing unit to execute the processor-executable program code to cause the system to:
   receive data including a plurality of discrete features, each of the plurality of discrete features associated with a plurality of discrete values;
   determine, for each of the plurality of discrete features, statistics based on a number of occurrences of each discrete value of the discrete feature in the data and not based on any continuous feature value;
   determine first summary statistics based on the statistics determined for each of the plurality of discrete features and not based on any continuous feature value;
   determine, for each discrete feature, a dissimilarity between the first summary statistics and the statistics determined for the discrete feature;
   determine N candidate discrete features of the plurality of discrete features associated with an N largest determined dissimilarities, the N candidate discrete features comprising less than all of the plurality of discrete features;
   determine a first selected continuous feature of the received data;
   determine, for each of the candidate discrete features, second summary statistics based on values of the first selected continuous feature associated with each discrete value of the candidate discrete feature;
   determine a deviation score for each of the candidate discrete features based on the second summary statistics; and
   transmit the candidate discrete features for display in association with the first selected continuous feature based on the determined deviation scores.

2. The system according to claim 1, wherein determination of the second summary statistics for a first candidate discrete feature comprises determination, for each discrete value of the first candidate discrete feature, of a sum of values of the first selected continuous feature associated with the discrete value, and determination of the second summary statistics based on the determined sums.

3. The system according to claim 1, wherein the determination of the dissimilarities comprises determination of cosine similarities.

4. The system according to claim 1, the processing unit to execute the processor-executable program code to cause the system to:
   determine a second selected continuous feature of the received data;
   determine, for each of the candidate discrete features, third summary statistics based on values of the second selected continuous feature associated with each discrete value of the candidate discrete feature;
   determine a second deviation score for each of the candidate discrete features based on the third summary statistics; and
   transmit the candidate discrete features for display in association with the second selected continuous feature based on the determined second deviation scores.

5. The system according to claim 4, wherein determination of the second summary statistics for a first candidate discrete feature comprises determination, for each discrete value of the first candidate discrete feature, of a sum of values of the first selected continuous feature associated with the discrete value, and determination of the second summary statistics based on the determined sums, and
   wherein determination of the third summary statistics for a first candidate discrete feature comprises determination, for each discrete value of the first candidate discrete feature, of a second sum of values of the second selected continuous feature associated with the discrete value, and determination of the third summary statistics based on the second sums.

6. The system according to claim 5, wherein the determination of the dissimilarities comprises determination of cosine similarities.

7. A method comprising:
   receiving data including a plurality of discrete features, each of the plurality of discrete features associated with a plurality of discrete values;
   determining, for each of the plurality of discrete features, statistics based on a number of occurrences of each discrete value of the discrete feature in the data and not based on any continuous feature value;
   determining first summary statistics based on the statistics determined for each of the plurality of discrete features and not based on any continuous feature value;
   determining, for each discrete feature, a dissimilarity between the first summary statistics and the statistics determined for the discrete feature;
   determining N candidate discrete features of the plurality of discrete features associated with an N largest determined dissimilarities, the N candidate discrete features comprising less than all of the plurality of discrete features;
   determining a first selected continuous feature of the received data;

determining, for each of the candidate discrete features, second summary statistics based on values of the first selected continuous feature associated with each discrete value of the candidate discrete feature;

determining a deviation score for each of the candidate discrete features based on the second summary statistics; and transmitting the candidate discrete features for display in association with the first selected continuous feature based on the determined deviation scores.

8. The method according to claim 7, wherein determining the second summary statistics for a first candidate discrete feature comprises determining, for each discrete value of the first candidate discrete feature, a sum of values of the first selected continuous feature associated with the discrete value, and determining of the second summary statistics based on the determined sums.

9. The method according to claim 7, wherein determining the dissimilarities comprises determining cosine similarities.

10. The method according to claim 7, further comprising:
determining a second selected continuous feature of the received data;
determining, for each of the candidate discrete features, third summary statistics based on values of the second selected continuous feature associated with each discrete value of the candidate discrete feature;
determining a second deviation score for each of the candidate discrete features based on the third summary statistics; and
transmitting the candidate discrete features for display in association with the second selected continuous feature based on the determined second deviation scores.

11. The method according to claim 10, wherein determining the second summary statistics for a first candidate discrete feature comprises determining, for each discrete value of the first candidate discrete feature, a sum of values of the first selected continuous feature associated with the discrete value, and determining the second summary statistics based on the determined sums, and
wherein determining the third summary statistics for a first candidate discrete feature comprises determining, for each discrete value of the first candidate discrete feature, a second sum of values of the second selected continuous feature associated with the discrete value, and determining the third summary statistics based on the second sums.

12. The method according to claim 11, wherein determining the dissimilarities comprises determining cosine similarities.

13. A non-transitory medium storing processor-executable program code executable by a processing unit of a computing system to cause the computing system to:
receive data including a plurality of discrete features, each of the plurality of discrete features associated with a plurality of discrete values;
determine, for each of the plurality of discrete features, statistics based on a number of occurrences of each discrete value of the discrete feature in the data and not based on any continuous feature value;
determine first summary statistics based on the statistics determined for each of the plurality of discrete features and not based on any continuous feature value;

determine, for each discrete feature, a dissimilarity between the first summary statistics and the statistics determined for the discrete feature;

determine N candidate discrete features of the plurality of discrete features associated with an N largest determined dissimilarities, the N candidate discrete features comprising less than all of the plurality of discrete features;

determine a first selected continuous feature of the received data;

determine, for each of the candidate discrete features, second summary statistics based on values of the first selected continuous feature associated with each discrete value of the candidate discrete feature;

determine a deviation score for each of the candidate discrete features based on the second summary statistics; and transmit the candidate discrete features for display in association with the first selected continuous feature based on the determined deviation scores.

14. The medium according to claim 13, wherein determination of the second summary statistics for a first candidate discrete feature comprises determination, for each discrete value of the first candidate discrete feature, of a sum of values of the first selected continuous feature associated with the discrete value, and determination of the second summary statistics based on the determined sums.

15. The medium according to claim 13, wherein the determination of the dissimilarities comprises determination of cosine similarities.

16. The medium according to claim 13, the processor-executable program code executable by the processing unit of the computing system to cause the computing system to:
determine a second selected continuous feature of the received data;
determine, for each of the candidate discrete features, third summary statistics based on values of the second selected continuous feature associated with each discrete value of the candidate discrete feature;
determine a second deviation score for each of the candidate discrete features based on the third summary statistics; and
transmit the candidate discrete features for display in association with the second selected continuous feature based on the determined second deviation scores.

17. The medium according to claim 16, wherein determination of the second summary statistics for a first candidate discrete feature comprises determination, for each discrete value of the first candidate discrete feature, of a sum of values of the first selected continuous feature associated with the discrete value, and determination of the second summary statistics based on the determined sums, and
wherein determination of the third summary statistics for a first candidate discrete feature comprises determination, for each discrete value of the first candidate discrete feature, of a second sum of values of the second selected continuous feature associated with the discrete value, and determination of the third summary statistics based on the second sums.

18. The medium according to claim 17, wherein determination of the dissimilarities comprises determining cosine similarities.

* * * * *